（12）United States Patent
Baugh et al.

(10) Patent No.: US 7,957,451 B1
(45) Date of Patent: Jun. 7, 2011

(54) COGNITIVE SPECTRAL SENSOR-BASED PN HOPPING/SPREADING SEQUENCE GENERATOR

(75) Inventors: David K. Baugh, Robins, IA (US); Joseph F. Jiacinto, Mount Vernon, IA (US); Robert J. Frank, Cedar Rapids, IA (US); Michael N. Newhouse, Cedar Rapids, IA (US); Dana J. Jensen, Marion, IA (US); Kent D. Benson, Marion, IA (US); Daniel M. Zange, Robins, IA (US); Gunther B. Frank, Robins, IA (US); Bruce S. Kloster, Cedar Rapids, IA (US); Richard L. Robertson, Cedar Rapids, IA (US); Karl F. Hoech, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 655 days.

(21) Appl. No.: 12/074,799

(22) Filed: Mar. 6, 2008

(51) Int. Cl.
*H04B 1/00* (2006.01)

(52) U.S. Cl. ........................................ 375/132

(58) Field of Classification Search .......... 375/130, 375/132, 133, 135, 136
See application file for complete search history.

(56) References Cited

U.S. PATENT DOCUMENTS

| 4,267,592 | A | | 5/1981 | Craiglow | 370/29 |
|---|---|---|---|---|---|
| 5,905,765 | A | | 5/1999 | Snodgrass | 375/346 |
| 5,937,002 | A | * | 8/1999 | Andersson et al. | 375/131 |
| 6,298,081 | B1 | * | 10/2001 | Almgren et al. | 375/132 |
| 6,643,278 | B1 | * | 11/2003 | Panasik et al. | 370/330 |
| 7,715,343 | B2 | * | 5/2010 | Tomioka | 370/329 |
| 2002/0021746 | A1 | * | 2/2002 | Schmidl et al. | 375/132 |
| 2003/0198280 | A1 | * | 10/2003 | Wang et al. | 375/132 |
| 2008/0101319 | A1 | * | 5/2008 | Rao | 370/342 |

OTHER PUBLICATIONS

Commercial cognitive commercial radio from Adapt 4—www. adapt4.com at least by Sep. 13, 2007.

* cited by examiner

*Primary Examiner* — Jean B Corrielus
(74) *Attorney, Agent, or Firm* — Matthew J. Evans; Daniel M. Barbieri

(57) ABSTRACT

A spread spectrum communication system includes a transceiver configured to transmit a spread spectrum waveform. The spread spectrum waveform comprises transmitted signals at varying frequencies within a radio frequency spectrum of operation. The frequency variation is controlled according to a hopping sequence. A spectral sensor of the communication system is configured to dynamically scan the radio frequency spectrum of operation and to generate channel occupancy data based upon the scans. A real time hopping sequence generator is configured to dynamically generate the hopping sequence in real time as a function of the channel occupancy data.

17 Claims, 5 Drawing Sheets

COGNITIVE SPECTRAL SENSOR-BASED PN HOPPING/SPREADING SEQUENCE GENERATOR

BACKGROUND

Spread spectrum communication systems are becoming more and more popular, especially as the available frequency spectrum is becoming more and more crowded with users and uses. This is true in both commercial and military applications. Spread spectrum communication systems have numerous advantages over conventional communication systems. One advantage of these systems is the signal security that the systems can provide. Unlike conventional systems it is extremely difficult to eavesdrop on a conversation that takes place using a spread spectrum communication system.

Some conventional communication systems try to cram as much information into as small a bandwidth as possible. These systems can easily be jammed by high-power jamming signals that cover the frequency band of the particular communication system. Also, the power output to the antenna of these conventional communication systems is relatively high, which is typically not optimal.

Spread spectrum communication systems spread the signal over as wide of a bandwidth as possible. Also, they try to hide the transmitted signal as close to the background noise as possible. This makes the communication very difficult to find in the frequency spectrum, and thus the communication cannot be easily tracked and is more difficult to jam. A common type of spread spectrum communication system is a frequency hopping system which uses a pseudorandom noise (PN) code to determine the frequency spectrum that the output signal will occupy. The PN code determines and controls the spreading pattern of the system. However, while providing some security, PN code control of the spreading or hopping pattern does not necessarily result in an optimum use of the frequency spectrum. A more optimized management of the frequency spectrum by such frequency hopping spread spectrum communication systems would potentially enhance security and system robustness.

The discussion above is merely provided for general background information and is not intended to be used as an aid in determining the scope of the claimed subject matter.

SUMMARY

A spread spectrum communication system includes a transceiver configured to transmit a spread spectrum waveform. The spread spectrum waveform comprises transmitted signals at varying frequencies within a radio frequency spectrum of operation. The frequency variation is controlled according to a hopping sequence. A spectral sensor of the communication system is configured to dynamically scan the radio frequency spectrum of operation and to generate channel occupancy data based upon the scans. A real time hopping sequence generator is configured to dynamically generate the hopping sequence in real time as a function of the channel occupancy data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Optimal frequency hopping or spreading sequences for a waveform operating in a given communication channel may depend on short-term and/or long term channel statistics and spectral occupancy states that change as a function of the "radio frequency (RF) environment" at the time of link establishment. Disclosed embodiments provide the ability to characterize these channel features dynamically and to develop more optimal spreading sequences "on the fly" based on the real time characterization of the RF spectrum of operation. Characterizing these channel features dynamically in this manner provides the potential to greatly simplify frequency management of tactical communications and to thereby enhance frequency-hopped or spread Electronic Counter Counter Measures (ECCM) waveform security and robustness. Disclosed embodiments provide and/or utilize a cognitive spectral sensor based hopping/sequence generator which characterizes channel features dynamically and develops more optimal spreading sequences based on real time characterization of the RF spectrum of operation.

Figure 1:
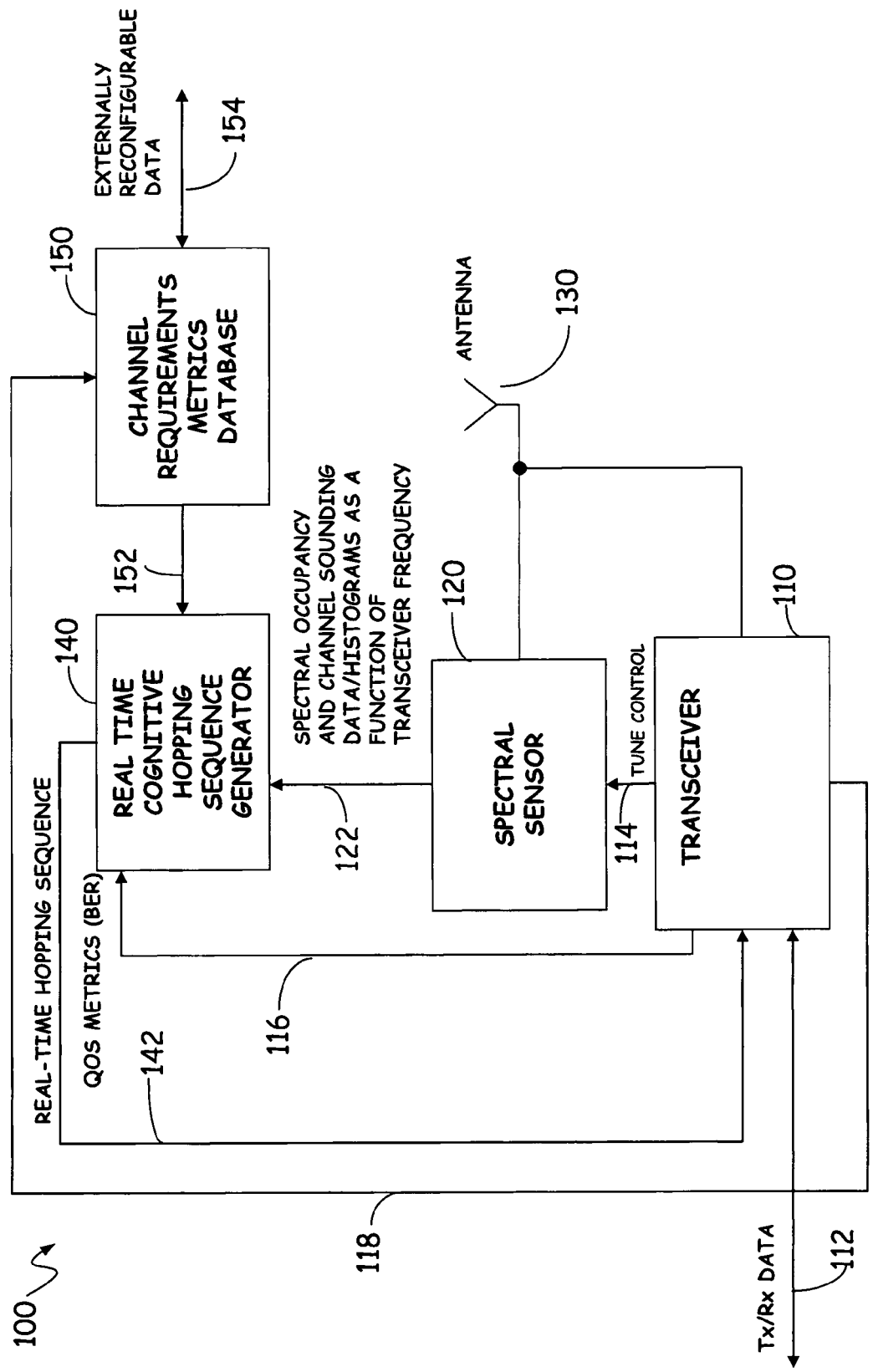
FIG. 1 is a block diagram illustrating a spread spectrum communication system.

FIG. 1 is a block diagram illustrating a communication system 100 which utilizes cognitive spectral sensor-based hopping/spreading sequence generation for use in spread spectrum communication systems. Communication system 100 includes transceiver 110, spectral sensor 120, antenna 130, real time cognitive hopping sequence generator 140 and channel requirements metrics database 150. Communication system 100 is a spread spectrum communication system which communicates over various frequencies in a radio frequency (RF) spectrum of operation (e.g. a communication channel) using a hopping sequence. In disclosed embodiments, the hopping sequence is generated or updated in real time at the time of link establishment as a function of the short-term and/or long term channel statistics and spectral occupancy, instead of being generated solely based upon a pseudorandom noise (PN) code.

Transceiver 110 contains circuitry configured to transmit and receive data signals at RF frequencies. Although shown as transceiver circuitry, transceiver 110 can be embodied as separate transmitter and receiver circuitry as well. In communication system 100, transceiver 110 is coupled to antenna 130 and uses the antenna to transmit and receive data over particular frequencies in the RF spectrum of operation. Transceiver 110 can be coupled to other systems or components, as shown at data line 112, to which received data (Rx) is provided and from which data (Tx) to be transmitted is obtained.

Spectral sensor 120 is a spectrum analyzer which provides both Fast Fourier Transform (FFT) and time-domain spectral occupancy and channel sounding data for the RF spectrum of operation to cognitive hopping sequence generator 140. The spectral occupancy and channel sounding data (shown at output 122 of spectral sensor 120), for example in the form of histograms or in other forms, is provided as a function of channel frequency. In some embodiments, under the control of a tune control output 114 from transceiver 110, spectral sensor 120 scans the portion of the frequency spectrum over which system 100 is capable of communicating.

Tune control 114 is used in the case of the spectral sensor 120 not being an integral part of the transceiver as shown in FIG. 1. In such an embodiment, tune control 114 provides a mechanism for transceiver 110 to provide control data to the spectral sensor 120, i.e., transceiver tune frequency, so that the sensor is aware of the frequency at which transceiver 110 is operating. Although tune control 114 is not required in all embodiments, there is a need for an interface of some type to allow spectral sensor 120 to "know" what frequency to tune to (based on the transceiver frequency), as well as an interface for the spectral sensor to communicate with the hopping sequence generator and channel database functions (or their embodiments within the system, as shown).

To optimize performance, faster scan rates can be utilized. For example, scan rates in excess of 18 GHz/second, and as high as 100 GHz/second are very beneficial. However, with possible performance tradeoffs, slower scan rates can be used. Generally, the faster the scan rate of spectral sensor 120, the more "real time" the spectral occupancy data 122 can be provided to cognitive hoping sequence generator 140.

Figure 2:
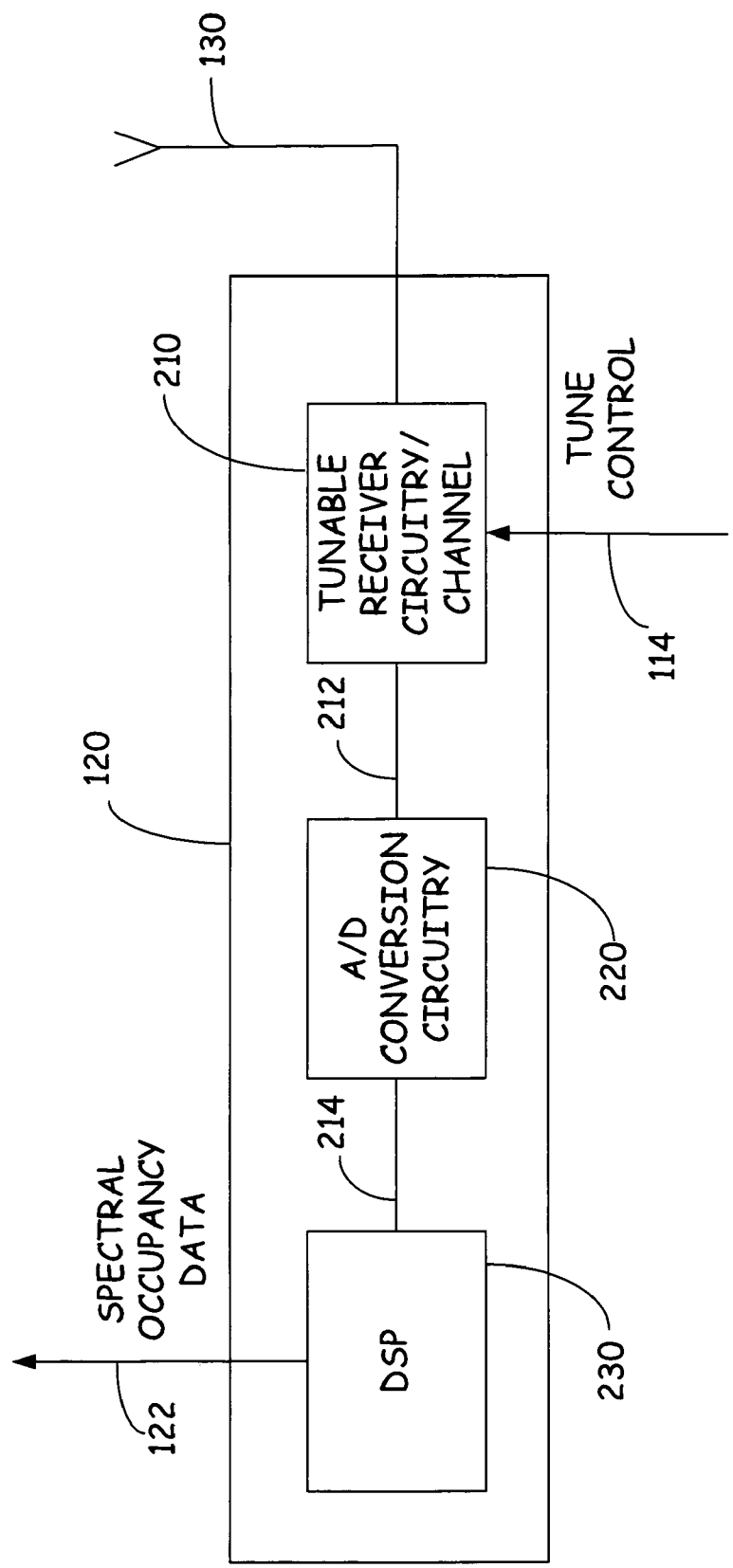
FIG. 2 is a block diagram illustrating an example embodiment of a spectral sensor which can be used in the disclosed communication system.
Figure 3:
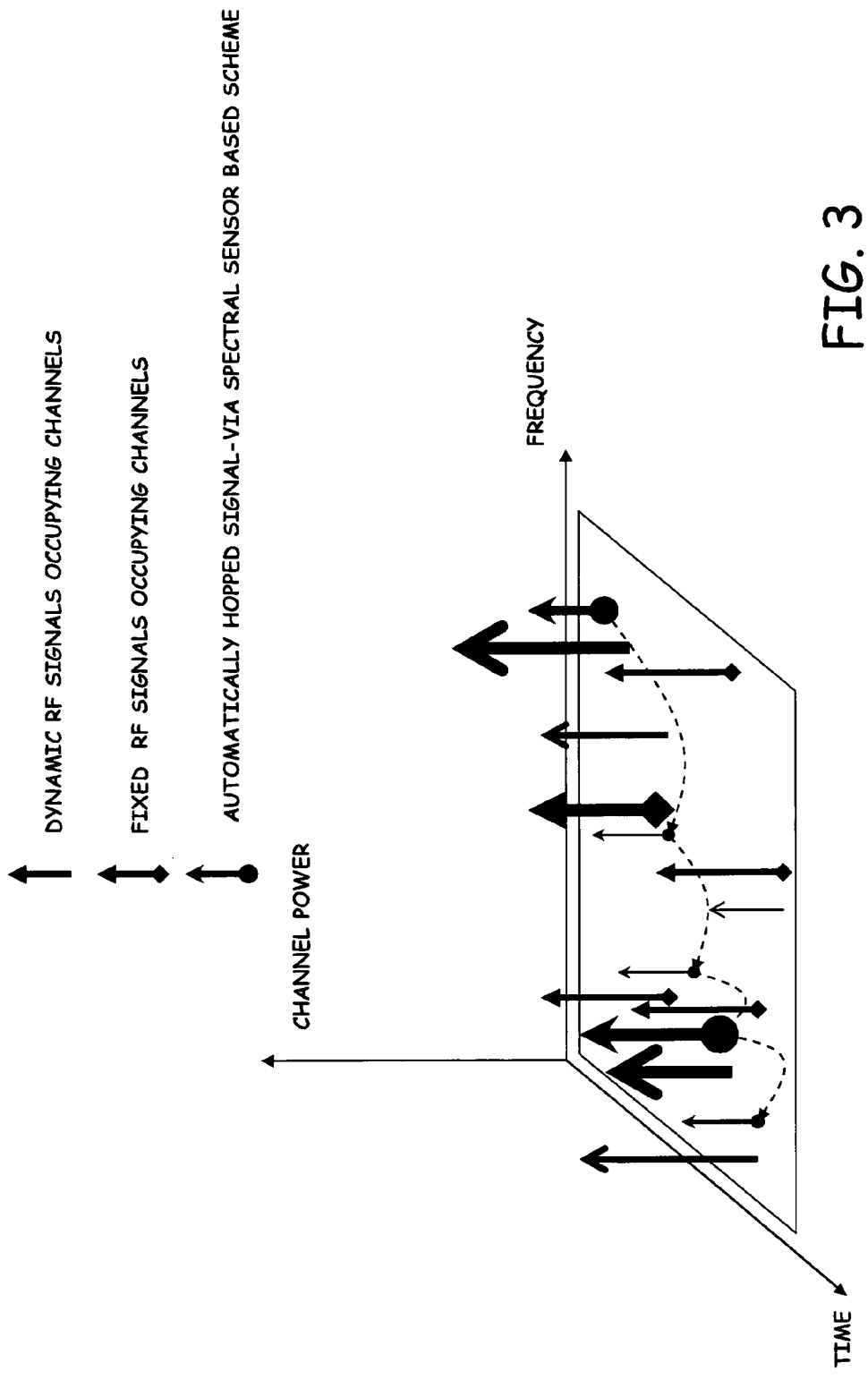
FIG. 3 is a three-dimensional plot illustrating dynamic interference avoidance as a function of time, frequency and channel power.

Referring for the moment to FIG. 2, shown is an embodiment of spectral sensor 120 in accordance with one example. As shown in FIG. 2, spectral sensor 120 includes tunable receiver circuitry (or channel) 210 which, under the control of tune control input 114, is tuned for small periods of time to each of many intermediate frequencies (Ifs) within the RF spectrum of operation. At each frequency to which circuitry 210 is tuned, circuitry 210 uses antenna 130 to detect electromagnetic energy. The electromagnetic energy can be in the form of fixed RF signals occupying frequency channels, dynamic RF signals occupying frequency channels, etc. These signals 212 can be referred to generally as channel occupancy signals. FIG. 3 provides a representation of these dynamic and fixed RF signals occupying channels, plotted as functions of time, frequency and power. As mentioned, faster scan rates through the RF spectrum of operation can enhance the "real time" hopping sequence adjustment aspects of disclosed embodiments.

As illustrated in FIG. 2, spectral sensor 120 also includes analog-to-digital (A/D) conversion circuitry 220. Circuitry 220 is coupled to tunable receiver circuitry 210 and digitizes the analog signals representing the electromagnetic energy detected, thereby digitally representing the channel occupancy signals. The digitized channel occupancy indicative signals are represented at output 214.

In example embodiments, A/D conversion circuitry 220 can be in various forms. For example, sigma-delta modulators are known in the art to provide fast A/D conversion, with relatively low power consumption. Other types of A/D conversion circuitry can also be used, depending on desired scanning rates and maximum power consumption levels. A/D conversion circuitry 220 can also be implemented within circuitry/channel 210 in some embodiments. As mentioned above, to enhance performance, scan rates in excess of 18 GHz/second, and as high as 100 GHz/second are frequently beneficial. In some embodiments, to make RF spectral sensor 120 usable in most spread spectrum communication systems, low power consumption is also beneficial. For example, power consumption of less than 5 Watts can lead to less battery usage, less heat produced, etc. Also, broad frequency coverage (e.g., 30-2500 MHz) and high sensitivity (e.g., −117 dBm) of spectral sensor 120 also enhance the performance. The sensitivity of the sensor needs to be commensurate with the sensitivity requirements of the waveform and/or transceiver being used in order to have the dynamic range that matches the host waveform/transceiver. Otherwise, the sensing function will not identify channels that the transceiver may be able to use.

Spectral sensor 120 also includes an on-board digital signal processor (DSP) 230 which receives the digitized channel occupancy signals or data. DSP 230 is configured to use this data to calculate or generate spectral occupancy data 122, for example in the form of FFT spectral data as a function of time. This is FFT In-phase Quadrature (I/Q) data of the RF spectrum being presented at the radio's various intermediate frequencies (IFs). In some example embodiments, the spectral sensing is being done at the final IF—in an IF sampled superheterodyne radio architecture. In a direct conversion scheme, the sensing can be done at DC. In a direct-sampled scheme, it is done directly at the input frequency being presented to the A/D conversion circuitry 220. The data observed via the FFT can be used in multiple ways. Over time, channel statistics can be calculated (spectral occupancy as a function of time) and used by configuring algorithms (program logic) to command the real time hopping sequence generator to generate a more optimal hopping sequence to avoid occupied channels as a function of time, for example.

Referring back to FIG. 1, communication system 100 includes real time cognitive hopping sequence generator 140 which receives the spectral occupancy data 122 from spectral sensor 120 and quality of service (QOS) metrics 116 from transceiver 110, and uses this information to generate the hopping sequence 142 in real time. This is in contrast to conventional hopping sequence generators which generate the hopping sequence well in advance and/or not as a function of spectral occupancy data or QOS metrics. The QOS metrics are typically in the form of bit error rates (BERs). A BER is computed by transceiver 110 by sending a known message to another transceiver and computing the resulting BER. This is sometimes referred to as channel sounding, and serves to quantify the QOS. It must be noted that BER is just one of several possible QOS metrics which can be utilized by communication system 100. A poor QOS can be indicative of a hopping sequence that is causing "collision" with other users/services in the spectrum, which is non-optimal from a QOS perspective. By knowing QOS, this adds the ability to quantify the quality of the dynamically generated hopping sequence. If the QOS drops below an acceptable level, the program logic of transceiver 110 and spectral sensor 120 re-scans the spectrum and re-generates the hopping sequence 142.

Real time cognitive hopping sequence generator 140 also generates the hopping sequence as a function of channel requirements metrics 152 provided by database 150. Channel requirements metrics 152 include data that is specific to the particular radio or communication system using the disclosed concepts. For example, in some embodiments, channel requirements metrics 152 include specific information on the channel characteristics (standards or requirements), for the different types of waveforms the transceiver 110 will be using, that are observable by the spectral sensor 120. In these embodiments, channel requirements metrics 152 can include bandwidth, observed power level, interference level, etc. This data is then used to determine (via program logic) the suitability of the scanned spectrum to support the different waveforms that transceiver 110 is capable of using. For example, due to observed channel traffic or distortion, a channel may be unsuitable for Code Division Multiple Access (CDMA), but may support analog cellular. This database 150 thus permits the on-board program logic in hopping sequence generator or elsewhere in communication system 100 to execute this decision structure and select an appropriate hopping waveform based on channel availability. In the illustrated embodiment, transceiver 110 provides an output 118 to database 150 to notify database 150 of its type, capabilities, waveforms, etc.

Database 150 can be updated using externally configurable data input 154. For example, if the sensor 120 is being used with a several different transceiver systems having differing capabilities, the channel requirements metrics in database 150 can be updated accordingly. Also, in a software defined radio embodiment, the system can be updated dynamically to take advantage of new waveforms with new channel requirements. As an example, in a tactical setting, one theater can have different frequency management policies that would impact the channel requirements database, as compared to another theater. Thus, there can exist a need to update the data stored in database 150.

Real time hopping sequences 142 produced by generator 140 represent optimized spreading sequences (e.g., sequence tables) based on the channel characterization data 122 provided by the spectral sensor and dynamically updated as RF channel conditions change in time. These sequences can be optimized to minimize interference of shared services or, in a tactical situation, friendly forces. Hopping sequence generator 140 can be configured to implement any of a variety of algorithms or computation techniques for generating the optimized hopping sequence. For example, based on spectral occupancy data 122 and channel requirements metrics 152, hopping sequence generator 140 can exclude certain occupied (or most occupied) frequencies from the possible hopping sequence, and then can apply a PN code technique to the remaining frequencies to generate the hopping sequence. Alternatively, generator 140 can be configured to apply weights to the PN code generation process to favor unoccupied or less occupied frequencies. Other techniques can be used as well.

Figure 4:
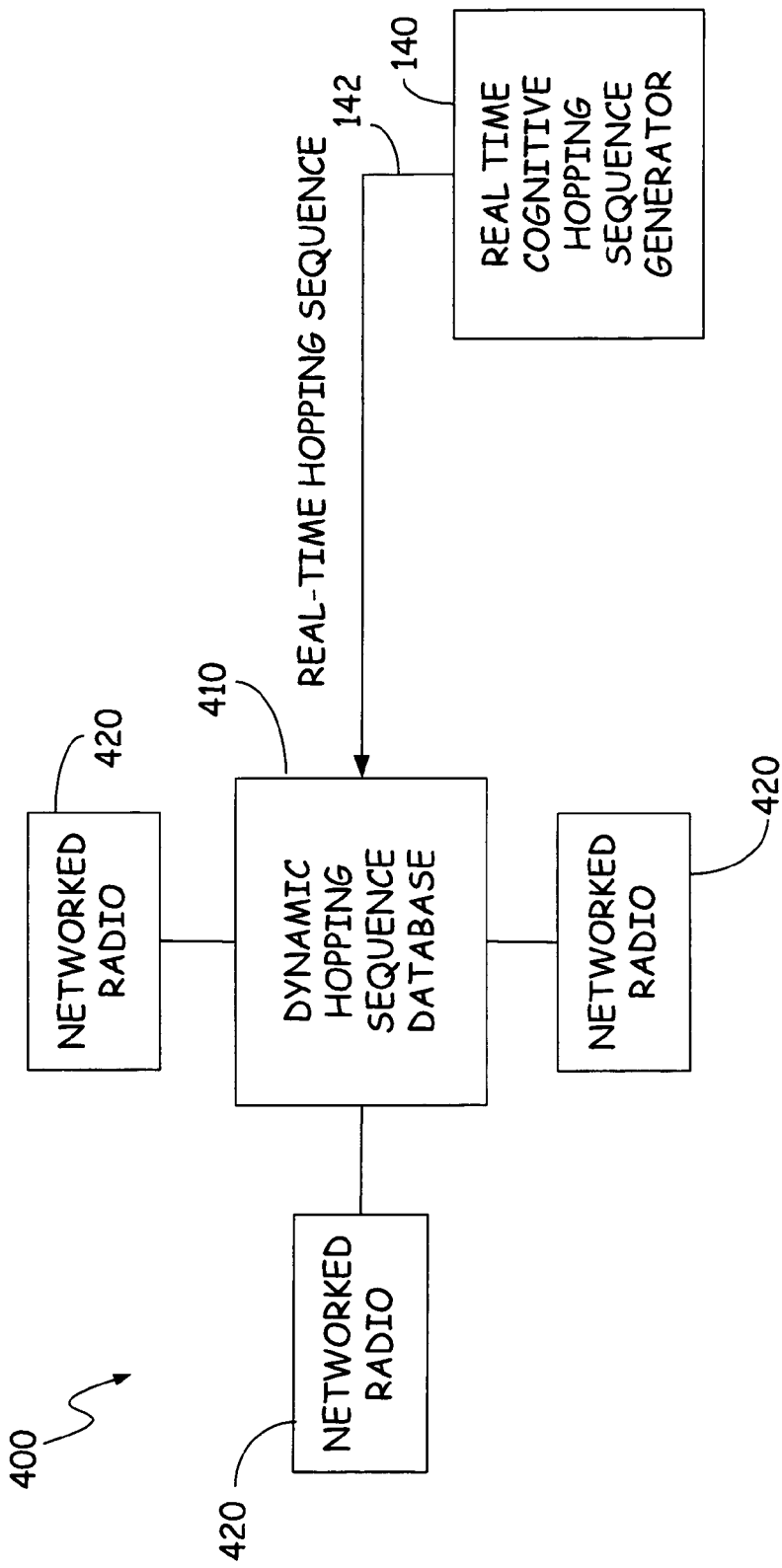
FIG. 4 is a block diagram illustrating a dynamic hopping sequence database which can be included in or used with disclosed communication systems and networked radios.

Referring back to FIG. 3, shown is a representation of an automatically hopped signal controlled using the automatically updated and optimized spreading sequences generated with the aid of spectral sensor 120. This illustration represents the hopped signal generated by transceiver 110 which minimizes or greatly reduces interference from dynamic and fixed RF signals. Furthermore, referring to FIG. 4, these sequences can be stored in a dynamic database 410 to allow networked radios 420 (the radio network being designated as 400) to "cooperate" and share optimal sequences they have computed for a given set of channel conditions.

Figure 5:
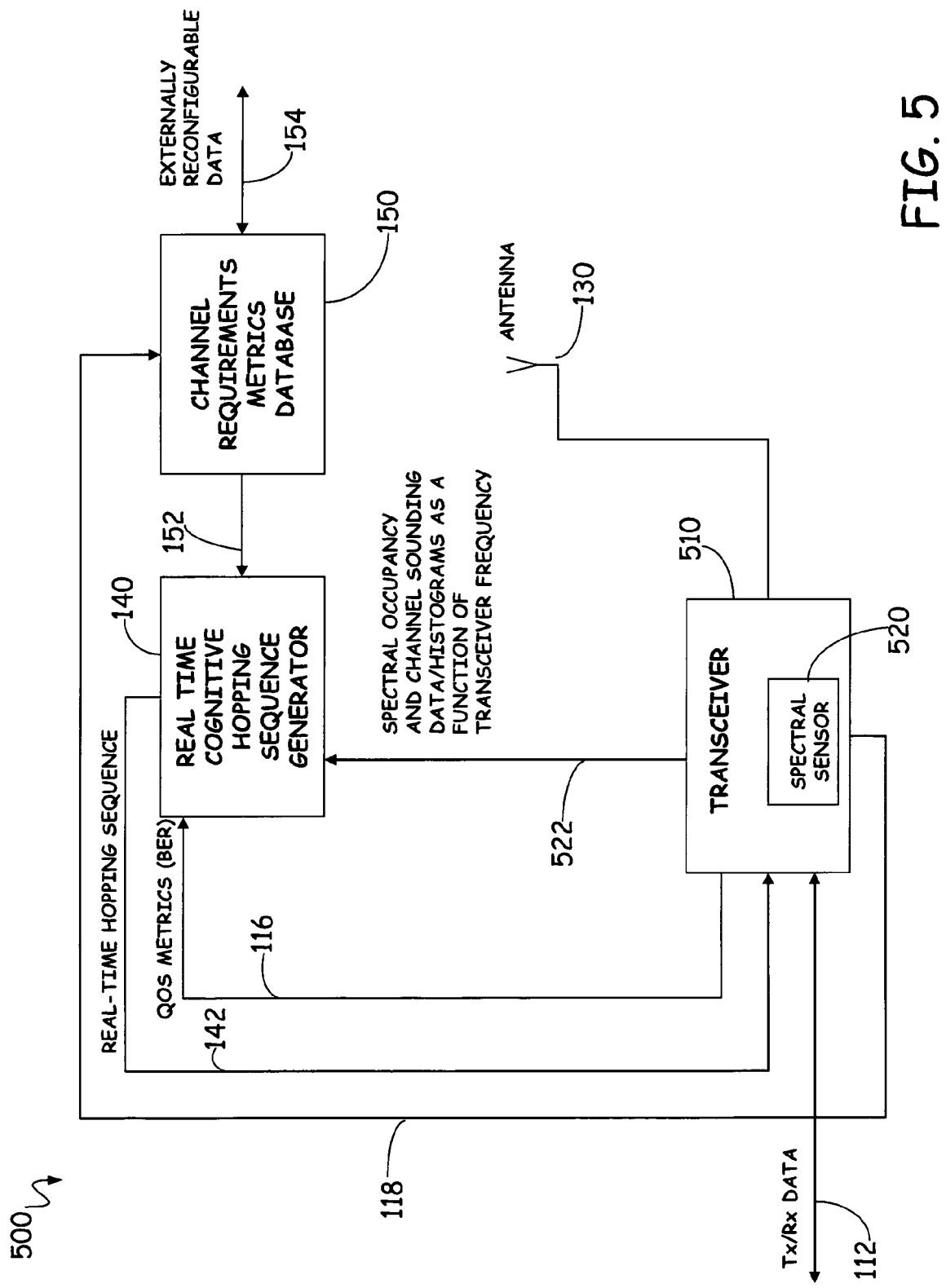
FIG. 5 is a block diagram illustrating an alternate embodiment of a spread spectrum communication system.

Referring now to FIG. 5, shown is an alternate embodiment of a communication system in accordance with disclosed embodiments and concepts. Communication system 500 is substantially the same as or similar to communication system 100 shown in FIG. 1, with the primary exception being that in communication system 500 spectral sensor 520 is incorporated into transceiver 510. This potentially eliminates the need for duplicate components between transceiver 510 and spectral sensor 520. For example, in communication system 100 shown in FIG. 1, both of transceiver 110 and spectral sensor 120 can have their own respective tunable receiver circuitry. This can be avoided in some embodiments in which the spectral sensor is incorporated into the transceiver. Since spectral occupancy data is provided to hopping sequence generator 140 by transceiver 510 in this embodiment, in FIG. 5 this spectral occupancy data is designated by reference number 522.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, in various embodiments, the spectral occupancy data can be processed by an on-board DSP processor of the transceiver, of the spectral sensor, or of a host radio to automatically and dynamically create optimized spreading sequences (e.g., tables), instead of utilizing a separate hopping sequence generator. Other examples of modifications of the disclosed concepts are also possible, without departing from the scope of the disclosed concepts.

What is claimed is:

1. A spread spectrum communication system, comprising:
   a transceiver configured to transmit a spread spectrum waveform, the spread spectrum waveform comprising transmitted signals at varying frequencies within a radio frequency spectrum of operation according to a hopping sequence;
   a spectral sensor configured to dynamically scan the radio frequency spectrum of operation and to generate channel occupancy data based upon the scans; and
   a real time hopping sequence generator coupled to the spectral sensor and configured to dynamically generate the hopping sequence in real time as a function of the channel occupancy data,
   wherein the transceiver is configured to generate a tune control signal and to provide the tune control signal to the spectral sensor, the tune control signal notifying the spectral sensor of a transceiver frequency so that the spectral sensor tunes to and scans the transceiver frequency.

2. The spread spectrum communication system of claim 1, wherein the spectral sensor is a spectrum analyzer configured to generate the channel occupancy data in the form of Fast Fourier Transforms.

3. The spread spectrum communication system of claim 2, wherein the spectrum analyzer is configured to generate the channel occupancy data in the form of time domain spectral occupancy data as a function of frequency.

4. The spread spectrum communication system of claim 1, wherein the spectral sensor is embodied within the transceiver.

5. The spread spectrum communication system of claim 1, wherein the transceiver is configured to generate quality of service metrics and to provide the generated quality of service metrics to the real time hopping sequence generator, wherein the real time hopping sequence generator is configured to dynamically generate the hopping sequence in real time also as a function of the quality of service metrics.

6. The spread spectrum communication system of claim 5, wherein the quality of service metrics include bit error rates.

7. The spread spectrum communication system of claim 5, and further comprising a channel requirements metrics database, wherein the transceiver is configured to provide an output to the channel requirements metrics database to notify the channel requirements metrics database of receiver specific information, and wherein in response to the receiver specific information, the channel requirements metrics database provides to the real time hopping sequence generator channel requirements metrics information for the transceiver.

8. The spread spectrum communication system of claim 7, wherein the real time hopping sequence generator is configured to dynamically generate the hopping sequence in real time also as a function of the channel requirements metrics information.

9. The spread spectrum communication system of claim 5, and further comprising:

a plurality of networked radios; and a dynamic hopping sequence database coupled to the real time hopping sequence generator and configured to store optimized hopping sequences generated by the real time hopping sequence generator or generated by one or more of the plurality of networked radios.

10. The spread spectrum communication system of claim 9, wherein the transceiver, the spectral sensor and the real time hopping sequence generator are embodied in one of the plurality of networked radios.

11. A spread spectrum communication system, comprising:

a spread spectrum transceiver configured to communicate at varying frequencies, the frequencies varying according to a hopping sequence;

a spectral sensor configured to dynamically scan the varying frequencies and to generate channel statistics data based upon the scans; and a real time hopping sequence generator coupled to the spectral sensor and configured to dynamically generate the hopping sequence in real time as a function of the channel statistics data, wherein the channel statistics data is in the form of spectral occupancy data, and wherein the transceiver is configured to generate quality of service metrics and to provide the generated quality of service metrics to the real time hopping sequence generator, wherein the real time hopping sequence generator is configured to dynamically generate the hopping sequence in real time also as a function of the quality of service metrics.

12. The spread spectrum communication system of claim 11, wherein the channel statistics data is in the form of Fast Fourier Transforms.

13. The spread spectrum communication system of claim 11, wherein the spectral sensor is embodied within the transceiver and shares tunable receiver circuitry with the transceiver.

14. The spread spectrum communication system of claim 11, wherein the quality of service metrics include bit error rates.

15. The spread spectrum communication system of claim 11, and further comprising a channel requirements metrics database, wherein the transceiver is configured to provide an output to the channel requirements metrics database to notify the channel requirements metrics database of receiver specific information, and wherein in response to the receiver specific information, the channel requirements metrics database provides to the real time hopping sequence generator channel requirements metrics information for the transceiver.

16. The spread spectrum communications system of claim 15, wherein the real time hopping sequence generator is configured to dynamically generate the hopping sequence in real time also as a function of the channel requirements metrics information.

17. The spread spectrum communication system of claim 11, and further comprising a dynamic hopping sequence database coupled to the real time hopping sequence generator and configured to store optimized hopping sequences generated by the real time hopping sequence generator or generated by one or more of a plurality of networked radios.

* * * * *